United States Patent
Davies

(10) Patent No.: US 11,953,081 B2
(45) Date of Patent: Apr. 9, 2024

(54) LEAD SCREW ASSEMBLY

(71) Applicant: Goodrich Actuation Systems Limited, Solihull (GB)

(72) Inventor: Stephen Davies, Shrewsbury (GB)

(73) Assignee: GOODRICH ACTUATION SYSTEMS LIMITED, Solihull (GB)

( * ) Notice: Subject to any disclaimer, the term of this patent is extended or adjusted under 35 U.S.C. 154(b) by 0 days.

(21) Appl. No.: 17/889,618

(22) Filed: Aug. 17, 2022

(65) Prior Publication Data

US 2023/0069566 A1     Mar. 2, 2023

(51) Int. Cl.
F16H 25/24     (2006.01)
F02K 1/76      (2006.01)

(52) U.S. Cl.
CPC ............. F16H 25/24 (2013.01); F02K 1/763 (2013.01); *F16H 2025/249* (2013.01)

(58) Field of Classification Search
CPC ............... F16H 25/24; F16H 2025/249; F16H 2025/2436; F16H 2025/228; F16H 2007/0857; F16H 25/20; F16H 25/2018; F02K 1/763
See application file for complete search history.

(56) References Cited

U.S. PATENT DOCUMENTS

| | | |
|---|---|---|
| 4,795,172 A | 1/1989 | Brande |
| 4,821,592 A | 4/1989 | Rousselot |
| 5,732,596 A | 3/1998 | Erikson et al. |
| 8,267,656 B2 | 9/2012 | Carvalho et al. |
| 2003/0029258 A1* | 2/2003 | Davies ............... F16H 25/2472 74/424.81 |
| 2010/0077879 A1* | 4/2010 | Davies ................ F02K 1/763 74/89.38 |
| 2018/0334239 A1* | 11/2018 | Moulon ............ F16H 25/2472 |
| 2019/0101196 A1 | 4/2019 | Lu et al. |
| 2020/0393027 A1* | 12/2020 | Ricard ................ F16H 25/205 |
| 2021/0404524 A1* | 12/2021 | Al-Mahshi ........... F16D 65/16 |

FOREIGN PATENT DOCUMENTS

| | | |
|---|---|---|
| EP | 1283384 A2 | 2/2003 |
| EP | 1283384 A3 | 2/2003 |
| WO | 2005036026 A2 | 4/2005 |
| WO | 2005036026 A3 | 4/2005 |

OTHER PUBLICATIONS

European Search Report for Application No. 21194593.6, dated Jan. 21, 2022, 10 pages.

* cited by examiner

*Primary Examiner* — Zakaria Elahmadi
(74) *Attorney, Agent, or Firm* — CANTOR COLBURN LLP

(57) ABSTRACT

A leadscrew assembly includes a screw shaft along which is formed a first helical groove and a primary nut along which is form a second helical groove. The first helical groove and the second helical groove cooperate to define a track. The assembly also includes a secondary nut along which is formed a third helical groove. The first helical groove and the third helical groove cooperate to define a track with a nominal running clearance. A preload X is provided wherein when a load applied to the screw exceeds the predetermined preload, the secondary nut engages with the track such that load of the screw above preload X is transferred through the secondary nut and thus protecting the primary nut.

6 Claims, 3 Drawing Sheets

LEAD SCREW ASSEMBLY

CROSS-REFERENCE TO RELATED APPLICATIONS

This application claims priority to European Patent Application No. 21194593.6 filed Sep. 2, 2021, the entire contents of which is incorporated herein by reference.

TECHNICAL FIELD

The present disclosure relates to a lead screw assembly.

BACKGROUND

Lead screws are used in many applications for translating rotary motion e.g. from a motor, to linear motion for a load, or from thrust to torque, and vice versa. A lead screw assembly consists of a screw and a nut, each with matching helical grooves. Rotation of one of the screw and the nut relative to the other causes relative linear motion of the other.

The suitability of a particular lead screw to an application is determined, at least in part, by a) load capacity, b) wear capacity c) fundamental efficiency.

Unlike ballscrews, in which screw efficiency is a constant, lead screw efficiency is a variable, with dependencies on lead angle, flank angle and friction coefficient.

Dynamic efficiency of a lead screw will typically range between 45% and 75% depending upon these variables, which in comparison with a ballscrew efficiency in the order of 95%, appear to render the lead screw an unfavourable choice in systems where power consumption is a major discriminator.

However, in some applications, the load and duty characteristics may identify a lead screw to offer a favourable choice when considering the associated cost savings, in the order of 66%, in comparison with a ball screw.

Electrically driven Thrust Reverser Actuation Systems (TRAS), for example, have particular requirements that lend themselves to a potential lead screw; including low operating drive torque compared to initial system acceleration torque and engine spool-up loading of the lead screw when fully deployed and in a static condition.

Spool-up loads can however be two to three times the maximum dynamic operating loads, which can cause damage to the screw parts. Therefore, in order to render a lead screw even more favourable for an electric TRAS application, it is desirable to actively limit the peak loads reacted by the lead screw nut and associated premature failure. By limiting the peak loads reacted by the lead screw nut, more materials of choice, with lower mechanical properties, become available for the manufacture of the nut, for example polymers and composites.

SUMMARY

The present disclosure provides a lead screw assembly that is designed to effectively reduce or limit the static loads reacted by the lead screw nut.

According to one aspect, there is provided a lead screw assembly comprising: a screw shaft along which is formed a first helical groove; a primary nut along which is formed a second helical groove; the first helical groove and the second helical groove cooperating to define a track; a secondary nut along which is formed a third helical groove; the first and third helical grooves co-operating to define a track with axial clearance; a machined spring arranged to provide an axial preloading X of the primary nut; wherein when a load applied to the screw exceeds the predetermined preload X, the secondary nut engages with the track such that additional load of the screw is transferred via the secondary nut.

According to another aspect, there is provided a TRAS having such a lead screw assembly to move the actuated surface(s).

DETAILED DESCRIPTION

Figure 1A:
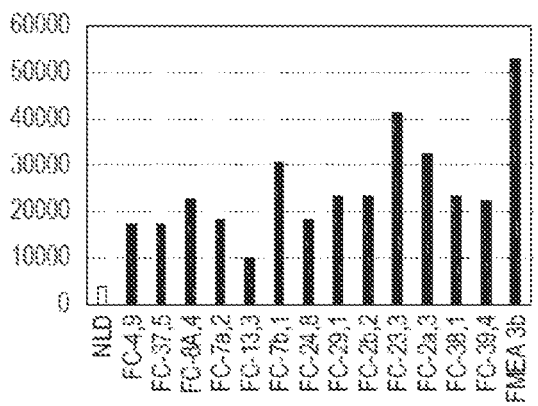
FIG. 1A shows, by way of background and example only, a load plot for the forces acting on a TRAS outer actuator.
Figure 1B:
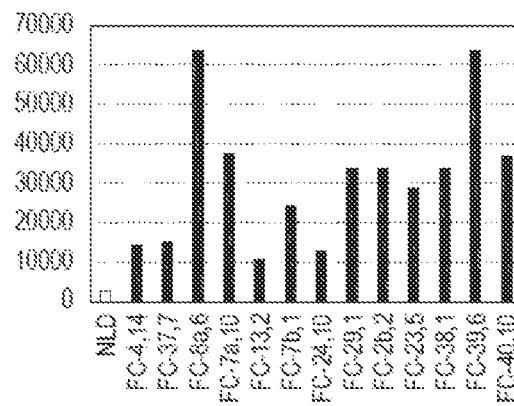
FIG. 1B shows, by way of background and example only, a load plot for the forces acting on a TRAS centre actuator.
Figure 1C:
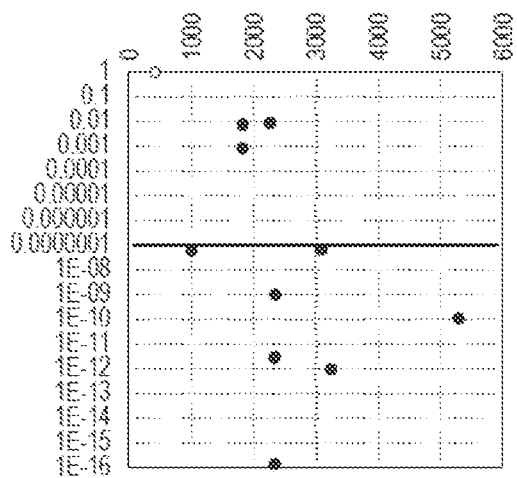
FIG. 1C shows, by way of background and example only, a load probability plot for the forces acting on a TRAS outer actuator.
Figure 1D:
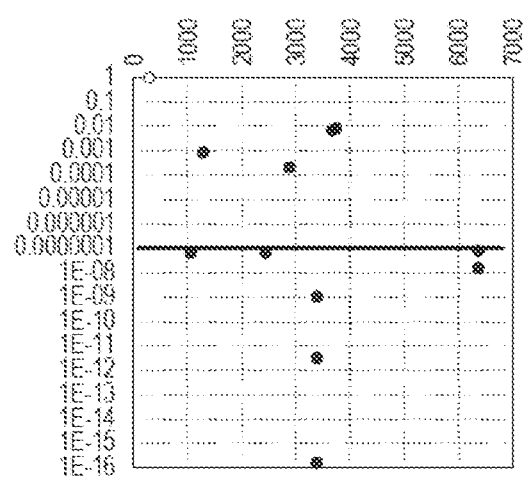
FIG. 1D shows, by way of background and example only, a load probability plot for the forces acting on a TRAS centre actuator.

With reference to FIGS. 1A-1D, and by way of background explanation only, it can be seen that only a very small part of the forces act on the actuator during the majority of the time of operation—i.e. during normal operation (represented as NLD—normal landing deployment). Therefore, for the majority of the time, the screw only needs to cope with a relatively small load acting on its components. High forces are rare. In the example shown, the NLD force is in the region of 4000N. The maximum failure load is around 13 times greater but rarely or never occurs.

Nevertheless, because these high forces can occur, the screw needs to be designed to cope with them if/when they do occur. Where ball screws are used, these are designed with materials hard enough to provide the required static load capacity for such loads. Such materials, e.g. Chronidur 30™, or martensitic alloys with high chromium content are generally very expensive. As mentioned above, though, there are also advantages in using lead screws provided they are able to handle such high forces.

To avoid damage to the screw parts under potential high loads, e.g. on spool-up, and/or to increase the range of applications where lead screws can be used, the present disclosure provides an assembly in which high loads do not act on the primary nut.

The lead screw according to this disclosure is designed such that a static load that exceeds a predetermined threshold, based on the normal operating dynamic loads with an error margin factored in, effectively bypasses the screw/primary nut track so that the screw only needs to be designed to handle static loads up to the predetermined threshold.

The bypass function according to this disclosure will now be described in more detail with reference to FIGS. 2 and 3.

The bypass function is provided, according to the disclosure, by introducing a pre-loading system between the screw primary nut and where the nut attaches to an actuator.

The assembly comprises a lead screw 1 provided with an outer helical thread 10 around which is provided a primary nut 2. The primary nut 2 has an inner helical thread 20 that engages with the outer helical thread of the screw 1.

The screw assembly translates rotation of the lead screw 1, by means of a driver (not shown) to linear motion of the primary nut 2 which moves along the screw thread ad the screw rotates. Linear movement of the primary nut 2 causes corresponding linear movement of a torque tube 3 with which the primary nut engages. A transfer member 4 is provided between the primary nut 2 and the torque tube 3 to transfer the movement of the nut to the torque tube 3. The torque tube may be connected to a surface or component to be moved e.g. the TRAS (not shown).

The assembly also includes a secondary nut 5 located between the transfer member 4 and the torque tube 3. The secondary nut 5 is provided with an inner thread 30 configured to cooperate with the outer thread of the lead screw 1.

Figure 2:
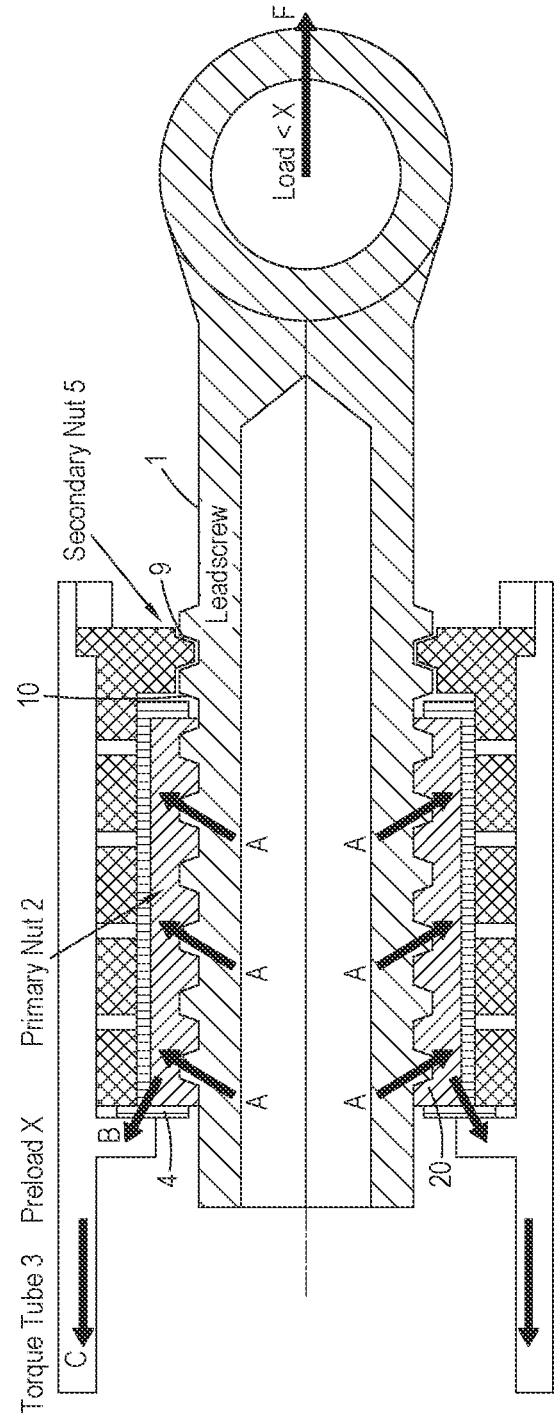
FIG. 2 is a side schematic view of a lead screw assembly according to the disclosure under normal load conditions.

FIG. 2 shows the lead screw assembly when operating under normal loads (up to a predetermined pre-load X).

The primary nut 3 is arranged with a pre-load X such that for forces F acting on the screw assembly up to the value X, the primary nut 2 is biased to the left in the drawings such that the primary nut 2 engages the torque tube 3 via the transfer member 4 so that axial loads F up to the value of the pre-load X are transferred to the torque tube via the primary nut 2. While the pre-load X is not exceeded by the actual axial load F, the secondary nut 5 is held to be spaced from engaging with the screw thread by a gap g, as shown in FIG. 2 and the secondary nut is redundant. Force is transferred from the lead screw 1 to the primary nut 2 via the engaging threads 10,20 and to the torque tube (arrows B and C).

Figure 3:
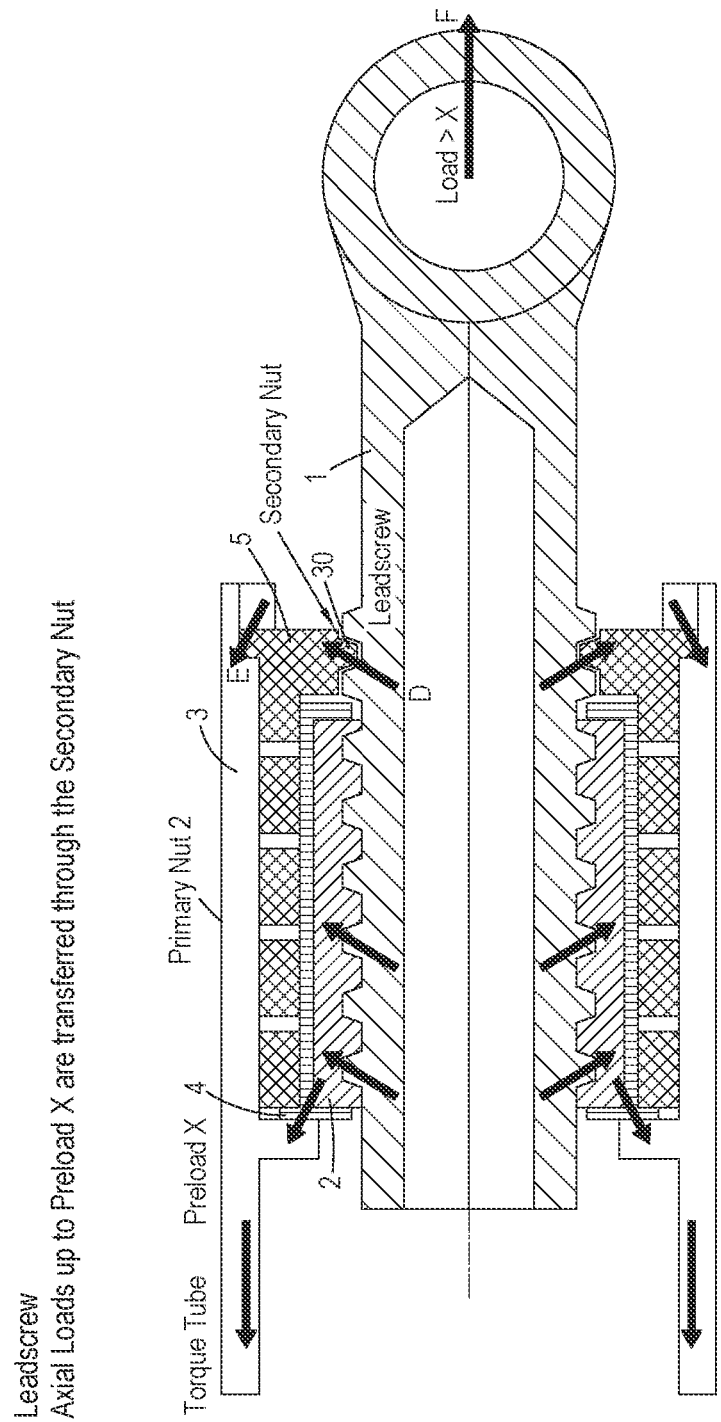
FIG. 3 is a side schematic view of a lead screw assembly according to the disclosure under high load conditions.

When the axial load F exceeds the pre-load X, as shown in FIG. 3, the excess force
overcomes the bias and pulls the primary nut and transfer member to the right in the drawings which, in turn, pushes against the secondary nut 5 and causes the secondary nut thread 30 to engage with the screw thread 10 to create a track between the screw and the secondary nut threads. Then, as can be seen in FIG. 3, any additional load F, exceeding the pre-load X, is transferred from the lead screw to the torque tube 3 via the secondary nut 2, thus limiting the magnitude of load transferred from the lead screw via the primary nut 2 to a value X (shown by arrows D, E).

The bypass function has particular benefits in relation to TRAS applications, but the design of this disclosure is not limited to such applications and can provide advantages in many lead screw applications.

The invention claimed is:

1. A lead screw assembly comprising:
   a screw shaft along which is formed a first helical groove;
   a primary nut along which is form a second helical groove;
   wherein the first helical groove and the second helical groove cooperate to define a track;
   means for applying a pre-load of a predetermined value X to bias the primary nut into engagement with the screw shaft such that rotary motion of the screw is translated to linear motion of the nut via the track and vice versa;
   a secondary nut arranged around the primary nut spaced from the first helical groove by the predetermined preload X, wherein when a load applied to the assembly exceeds the predetermined preload, the secondary nut engages with the first helical groove such that motion of the screw is transferred to motion of the secondary nut and bypasses the primary nut such that the load does not act on the primary nut;
   torque tube; and
   a transfer member provided between the primary nut and the torque tube to transfer the movement of the nut to the torque tube, wherein the secondary nut is provided between the transfer member and the torque tube.

2. The assembly of claim 1, wherein the predetermined preload X is a value selected based on operational load profiles.

3. The assembly of claim 2, wherein the predetermined preload X is selected as being equal to the maximum normal operating dynamic load for the lead screw plus a predetermined error margin.

4. The assembly of claim 1, wherein the secondary nut is spaced from the screw shaft by a distance in the order of 0.1 to 0.5 mm.

5. The assembly of claim 1, wherein the first and second helical grooves are made of AMS 5659 (15-5 PH).

6. A Thrust Reverser Actuation System (TRAS), comprising:
   a surface to be actuated; and
   an actuator comprising a lead screw assembly as claimed in claim 1, arranged to move the surface responsive to the relative motion between the screw shaft and the primary nut or secondary nut.

* * * * *